(12) United States Patent
Kim

(10) Patent No.: US 12,128,814 B2
(45) Date of Patent: Oct. 29, 2024

(54) LAMP SYSTEM AND METHOD FOR CONTROLLING THE SAME

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/496,974

(22) Filed: Oct. 30, 2023

(65) Prior Publication Data
US 2024/0181954 A1   Jun. 6, 2024

(30) Foreign Application Priority Data

Dec. 5, 2022   (KR) .................. 10-2022-0167303

(51) Int. Cl.
*B60Q 1/08*   (2006.01)
*B60Q 1/00*   (2006.01)

(52) U.S. Cl.
CPC ........... *B60Q 1/085* (2013.01); *B60Q 1/0023* (2013.01); *B60Q 1/0094* (2013.01); *B60Q 2300/054* (2013.01)

(58) Field of Classification Search
CPC .................. B60Q 1/085; B60Q 2300/054
See application file for complete search history.

(56) References Cited

U.S. PATENT DOCUMENTS

2023/0256895 A1*   8/2023   Sung .................... H05B 47/105
                                                              315/82

* cited by examiner

*Primary Examiner* — Robert J May
(74) *Attorney, Agent, or Firm* — Novo TechIP International PLLC

(57) ABSTRACT

The present invention provides a lamp system. According to an embodiment, the lamp system may include: a light output unit provided in a vehicle to irradiate light; a sensor unit detecting surrounding environment information of the vehicle; a memory storing an image program output by the light output unit; and a processor executing the image program based on the surrounding environment information, in which the image program may include an adaptive driving beam (ADB) algorithm and a road surface projection algorithm of the vehicle, and the processor may include a first buffer allocated to the adaptive driving beam algorithm of the vehicle, and a second buffer allocated to the road surface projection algorithm.

15 Claims, 8 Drawing Sheets

LAMP SYSTEM AND METHOD FOR CONTROLLING THE SAME

CROSS-REFERENCE TO RELATED APPLICATIONS

This application claims priority under 35 U.S.C. § 119 to Korean Patent Application No. 10-2022-0167303, filed on Dec. 5 2022, in the Korean Intellectual Property Office, the disclosure of which is incorporated herein by reference in its entirety.

TECHNICAL FIELD

The following disclosure relates to a lamp system and a method for controlling the same, and more particularly, to a lamp system provided in front of a vehicle and a method for controlling the same.

BACKGROUND

There is a problem in that safe driving interferes when a driver manually uses a low beam and a high beam alternately while driving the vehicle. To prevent this, a glare free high beam technology capable of continuously driving the high beam without dazzling oncoming vehicles and preceding vehicles has been developed. The glare free high beam technology includes both high beam assistance (HBA) and adaptive driving beam (ADB) technologies, which are the core technologies of intelligent headlamps. In particular, the ADB is a technology that greatly improves driver's visibility by illuminating a high beam of a headlamp composed of a plurality of LEDs except for the oncoming vehicle and the preceding vehicle areas recognized through a front camera.

Recently, a car lighting device has been developed to perform a function of transmitting information to a driver, a driver of another vehicle, a pedestrian, etc., in addition to a function of securing visibility or transmitting a signal related to traveling information. In one example, the car lighting device projects an image or light onto a road surface around a vehicle. For example, by outputting welcome lighting on the road surface or displaying weather conditions on the road surface, the car lighting device outputs the vehicle condition or road surface condition to a driver as various types of information. Alternatively, the car lighting device outputs 'communication lighting' which enables communication with pedestrians. In addition to this, the car lighting device is also provided so that a driver may enjoy images or videos by projecting light onto the road surface.

However, in a headlamp system of a vehicle, since an algorithm for performing ADB and an algorithm for projecting light on a road surface are different from each other, it is difficult to simultaneously perform these two algorithms.

SUMMARY

An embodiment of the present invention is directed to providing a lamp system capable of simultaneously performing an adaptive driving beam (ADB) algorithm and a road surface projection algorithm of a vehicle and a method for controlling the same.

Aspects of the present invention are not limited to the above-mentioned aspects. That is, other aspects that are not described may be obviously understood by those skilled in the art from the following specification.

In one general aspect, a lamp system includes: a light output unit provided in a vehicle to irradiate light; a sensor unit detecting surrounding environment information of the vehicle; a memory storing an image program output by the light output unit; and a processor executing the image program based on the surrounding environment information, in which the image program may include an adaptive driving beam (ADB) algorithm and a road surface projection algorithm of the vehicle, and the processor may include a first buffer allocated to the adaptive driving beam algorithm of the vehicle and a second buffer allocated to the road surface projection algorithm.

The light output unit may include: a first light output unit connected to the first buffer; and a second light output unit connected to the second buffer.

The image program may be provided so that a difference in brightness between an overlapping area in which the light irradiated from the light output unit overlaps and a non-overlapping area in which the light irradiated from the light output unit does not overlap is within a predetermined range.

The light output unit may include the first light output unit and the second light output unit for irradiating light above the first light output unit that are provided on left and right sides of the vehicle, respectively, and the image program may be provided so that a brightness of light output from each light output unit may be halved in an area where two lights of the light output unit overlap, and the brightness of light output from each light output unit may be ¼ in an area where four lights of the light output unit overlap.

The light output unit may include: a first optical channel formed by an adaptive driving beam algorithm of the vehicle; and a second optical channel formed by the road surface projection algorithm, and the image program may be provided so that any one of the first optical channel and the second optical channel is provided to be transparently processed in the area where the images overlap.

The processor may allocate the first buffer and the second buffer to the road surface projection algorithm when a wall surface exists in front of the vehicle.

When a distance between the wall surface and the vehicle exceeds a predetermined distance, the image program may be provided so that a resolution of the second light output unit increases as the distance between the wall surface and the vehicle increases.

The processor may include: a plurality of graphic Integrated Circuits (ICs); a chip select pin downloading the image program and transmitting the downloaded image program to the graphic IC through a chip select line; and a slide switch branching the chip select line to connect the chip select line to each input terminal of the graphic IC and individually turn on/off the chip select line.

In another general aspect, a method for controlling a lamp system, wherein the lamp system comprises: a processor performing an adaptive driving beam (ADB) algorithm and a road surface projection algorithm and having a first buffer and a second buffer, and a light output unit having a first light output unit connected to the first buffer and a second light output unit connected to the second buffer, in which the adaptive driving beam algorithm of the vehicle may be allocated to the first buffer and the road surface projection algorithm may be allocated to the second buffer so that the adaptive driving beam algorithm of the vehicle and the road surface projection algorithm are simultaneously implemented.

A difference in brightness between an overlapping area in which the light irradiated from the light output unit overlaps and a non-overlapping area in which the light irradiated from the light output unit does not overlap may be within a predetermined range.

The first light output unit and the second light output unit may be provided on left and right sides of the vehicle, respectively, a brightness of light output from each light output unit may be halved in an area where two lights of the light output unit overlap, and the brightness of light output from each light output unit may be ¼ in an area where four lights of the light output unit overlap.

The light output unit may include: a first optical channel formed by an adaptive driving beam algorithm of the vehicle; and a second optical channel formed by the road surface projection algorithm, and when the first optical channel and the second optical channel overlap to form an image, any one of the first optical channel and the second optical channel may be provided to be transparently processed in the area where the images overlap.

The processor may allocate the first buffer and the second buffer to the road surface projection algorithm when a wall surface exists in front of the vehicle.

When a distance between the wall surface and the vehicle exceeds a predetermined distance, a resolution of the second light output unit may increase as the distance between the wall surface and the vehicle increases.

The processor may include: a plurality of graphic ICs; a chip select pin downloading an image program and transmitting the downloaded image program to the graphic IC through a chip select line; and a slide switch branching the chip select line to connect the chip select line to each input terminal of the graphic IC and individually turn on/off the chip select line.

DETAILED DESCRIPTION

Figure 1:
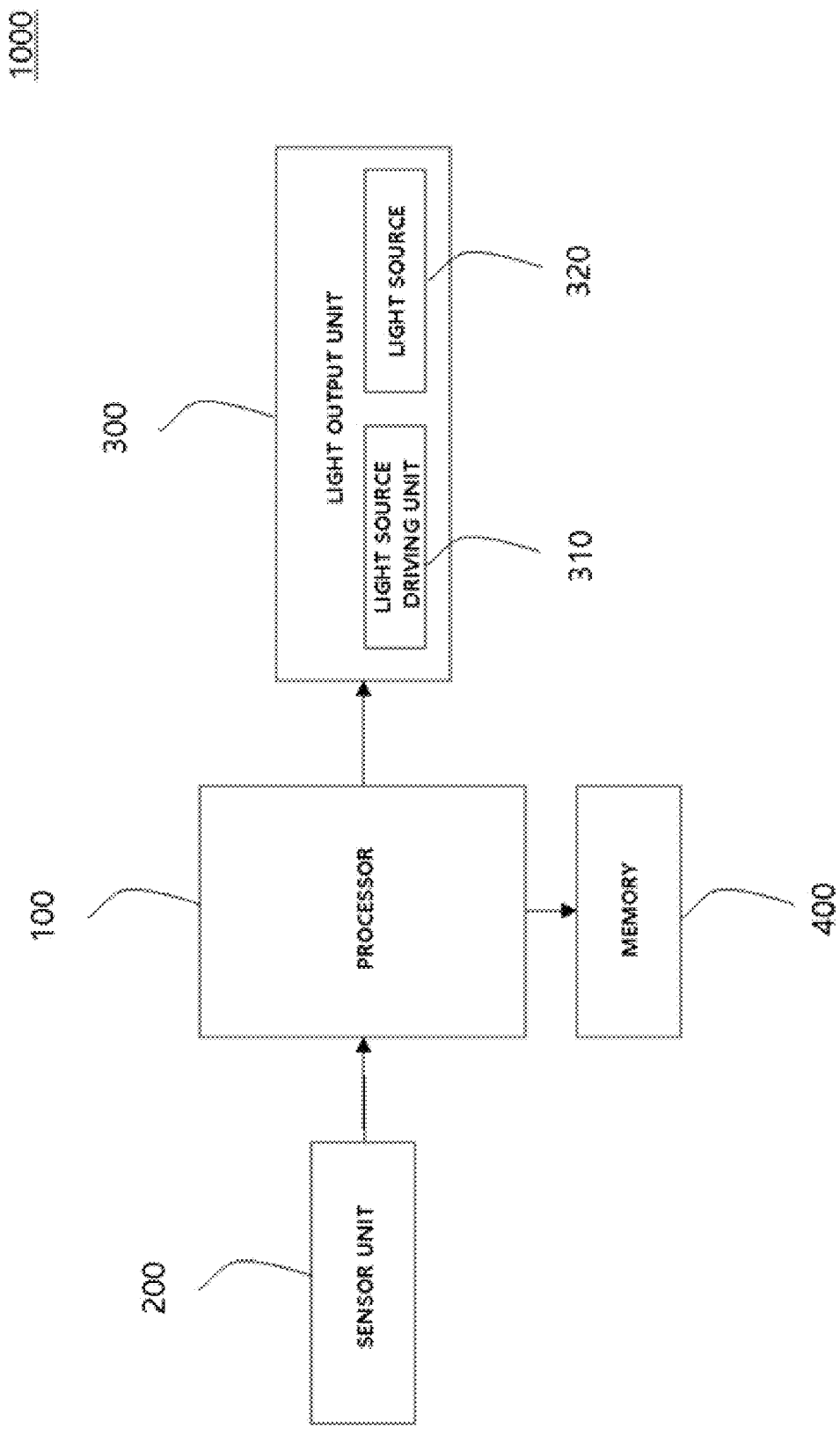
FIG. 1 is a diagram illustrating a configuration of a lamp system of the present invention.

Hereinafter, exemplary embodiments of the present disclosure will be described in detail with reference to the accompanying drawings so that those skilled in the art to which the present disclosure pertains may easily practice. However, the present disclosure may be implemented in various different forms, and is not limited to the embodiments described herein. In addition, in the drawings, portions unrelated to the description will be omitted to clearly describe the present disclosure, and similar portions will be denoted by similar reference numerals throughout the specification.

Throughout the present specification, when any one part is referred to as being "connected to" another part, it means that any one part and another part are "directly connected to" each other or are "electrically connected to" each other with still another part interposed therebetween.

Throughout the present specification, when any member is referred to as being positioned "on" other member, it includes not only a case in which any member and another member are in contact with each other, but also a case in which the other member is interposed between any member and another member.

Throughout the present specification, "including" any component will be understood to imply the inclusion of other components rather than the exclusion of other components, unless explicitly described to the contrary. The terms "about," "substantially," and the like used throughout the present specification means figures corresponding to manufacturing and material tolerances specific to the stated meaning and figures close thereto, and are used to prevent unconscionable abusers from unfairly using the disclosure of figures precisely or absolutely described to aid the understanding of the present disclosure. The term "~step" or "~step of" used throughout the present specification of the present invention does not mean "~step for."

Hereinafter, embodiments of the present invention will be described in detail with reference to the accompanying drawings. However, the present invention is not limited to exemplary embodiments herein, but may be implemented in other forms. Same reference numerals denote same constituent elements throughout the specification.

Hereinafter, embodiments of the present invention will be described in detail with reference to the accompanying drawings.

FIG. 1 is a diagram illustrating a configuration of a lamp system 1000 of the present invention. Referring to FIG. 1, in one embodiment, the lamp system 1000 includes a light output unit 300, a sensor unit 200, a memory 400, and a processor 100.

Figure 2:
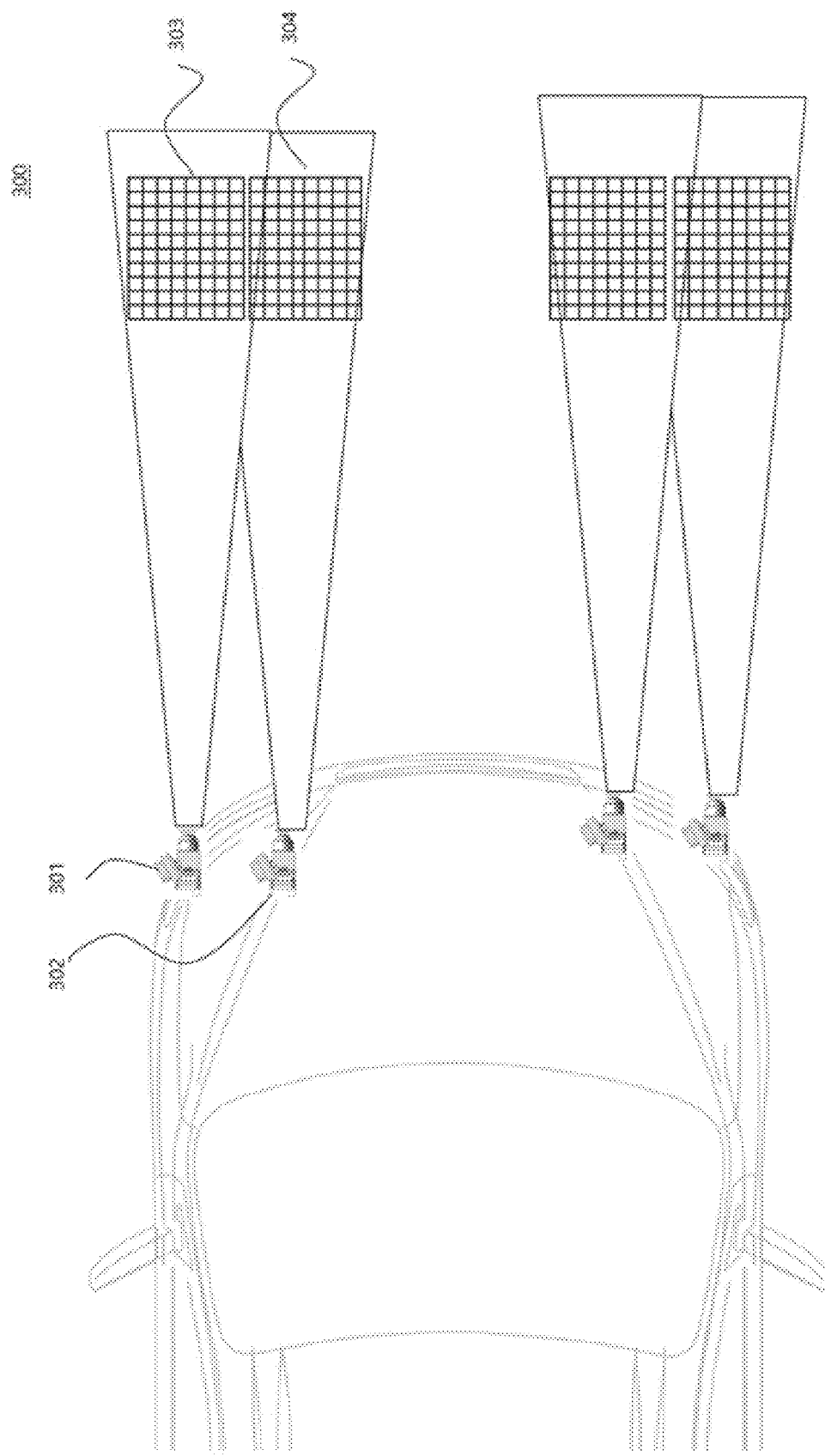
FIG. 2 is a diagram illustrating an appearance of a light output unit according to an embodiment of the present invention.

The light output unit 300 is provided in a vehicle to irradiate light. In one example, the light output unit 300 may be a headlamp provided in the vehicle. The light output unit 300 may be provided on left and right sides of the vehicle, respectively. In one example, the light output unit 300 has a light source 320 and a light source driving unit 310 that drives the light source 320. In one example, the light source 320 may be provided as halogen, xenon, LED, laser, or the like. FIG. 2 illustrates an appearance of the light output unit 300 according to an embodiment of the present invention. Referring to FIG. 2, in one example, the light output unit 300 may include a first light output unit 301 and a second light output unit 302. In one example, the second light output unit 302 may irradiate light under the first light output unit 301. However, unlike this, the first light output unit 301 and the second light output unit 302 may be provided to irradiate light to the same area. Unlike this, any one of the first light output unit 301 and the second light output unit 302 may radiate light to the left or right of the other one.

The sensor unit 200 detects surrounding environment information of the vehicle and transmits the detected surrounding environment information to the processor 100. In one example, the surrounding environment information of the vehicle may include whether there are obstacles around the vehicle, a type of obstacles, a distance between the vehicle and the obstacle, and the like. In one example, the sensor unit 200 may include a camera, a light detection and ranging (LIDAR) sensor, a radar sensor, and the like.

The memory 400 stores an image program output by the light output unit 300. In one example, the image program includes an adaptive driving beam (ADB) algorithm and a road surface projection algorithm of the vehicle, and the adaptive driving beam algorithm of the vehicle may irradiate a low beam or a high beam to the front of the vehicle according to the surrounding environment information of the vehicle received from the sensor unit 200. The road surface projection algorithm may irradiate light or image or video to a road surface located in front of the vehicle according to the situation according to the surrounding environment information of the vehicle received from the sensor. The light irradiated by the adaptive driving beam algorithm of the vehicle forms a first optical channel 303, and the light irradiated by a road surface projection algorithm forms a second optical channel 304. In one example, the first optical channel 303 and the second optical channel 304 are provided to individually form an image, or the first optical channel 303 and the second optical channel 304 are combined to form an image.

Figure 3:
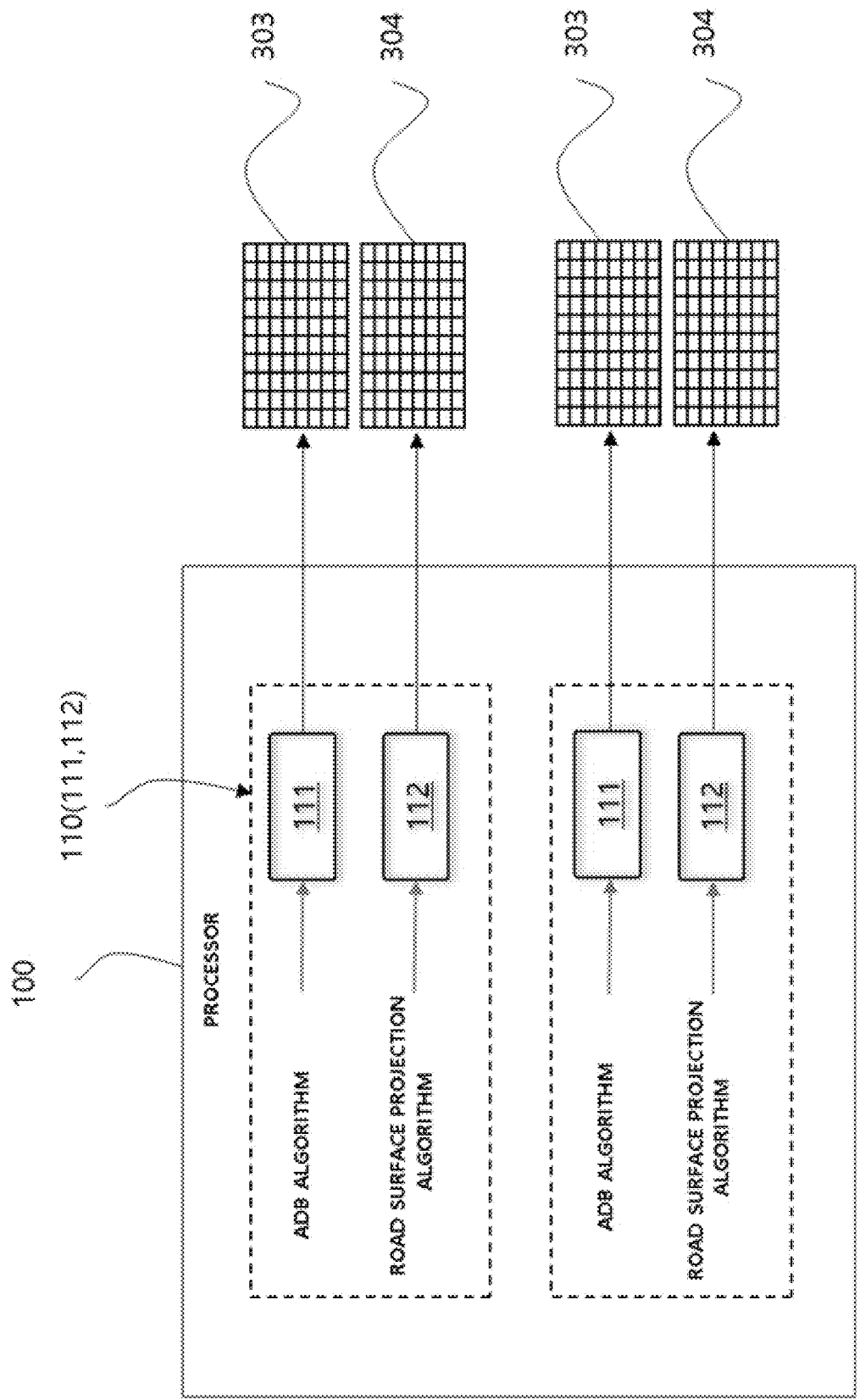
FIGS. 3 and 4 each are diagrams illustrating a configuration of a processor according to an embodiment of the present invention.
Figure 4:
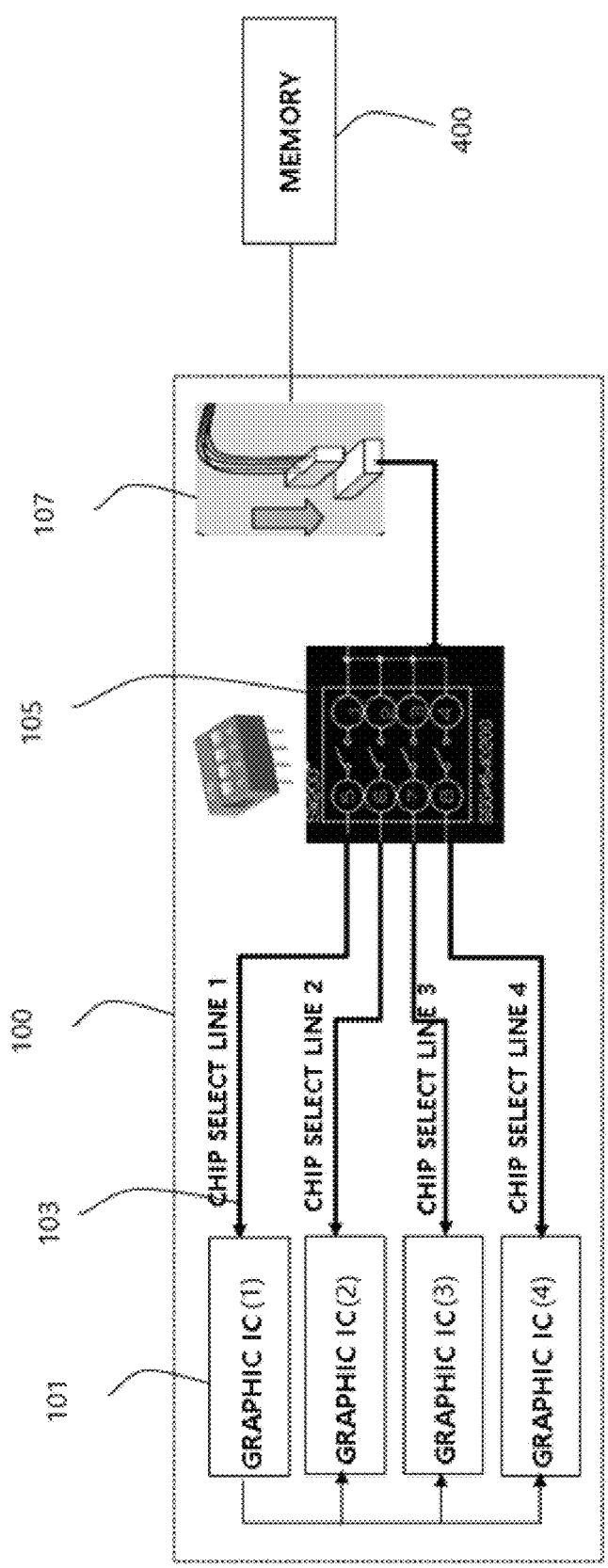

FIGS. 3 and 4 each are diagrams illustrating a configuration of a processor 100 according to an embodiment of the present invention. Referring to FIG. 3, the processor 100 includes a buffer 110. In one example, the buffer 110 may include a first buffer 111 and a second buffer 112. The processor 100 executes an image program based on surrounding environment information measured by the sensor unit 200. The first buffer 111 is allocated to the adaptive driving beam algorithm of the vehicle and the second buffer 112 is allocated to the road surface projection algorithm. The adaptive driving beam algorithm of the vehicle and the road surface projection algorithm are each allocated to different buffers, and therefore, can be implemented simultaneously. In one embodiment, the first light output unit 301 is connected to the first buffer 111, and the second light output unit 302 is connected to the second buffer 112. Accordingly, the image program transmitted from the first buffer 111 is output through the first light output unit 301, and the image program transmitted from the second buffer 112 is output through the second light output unit 302.

Referring to FIG. 4, the processor 100 may include a graphic IC 101, a chip select pin 107 and a slide switch 105. The graphic IC 101 processes video to execute an image program stored in the memory 400 unit. In one example, the above-described buffer 110 may be provided within graphics IC 101. In one example, a plurality of graphic ICs 101 are provided. The chip select pin 107 downloads the image program and transfers the downloaded image program to the graphic IC 101 through the chip select line 103. The slide switch 105 branches the chip select line 103. The slide switch 105 allows the chip select line 103 to be connected to each input terminal of the graphic IC 101. The slide switch 105 turns the chip select lines 103 on/off individually. Accordingly, only the graphic IC 101, which needs to download an image program, is activated to perform the download.

In order to transmit multi-channel videos, the capacity of video RAM inside the graphic IC 101 is important. The video RAM should be able to cover the capacity to output more than two channels of videos. The capacity of the video RAM is determined by a resolution of the image to be output, the number of channels of an output video, and the number of buffers. For example, the capacity of the video RAM may be provided by multiplying the resolution, the number of channels of an output video, and the number of buffers. For example, when the number of channels of video and the number of buffers are two, the resolution is provided as 1152*1152 and the capacity of the video RAM is provided as 5,308,416 Byte (5.3 MB).

Hereinafter, a method for controlling a lamp device 1000 according to the present invention will be described with reference to FIGS. 5 to 8. A controller for controlling a lamp system 1000 may be provided to perform a method for controlling a lamp system 1000 described below.

Figure 5:
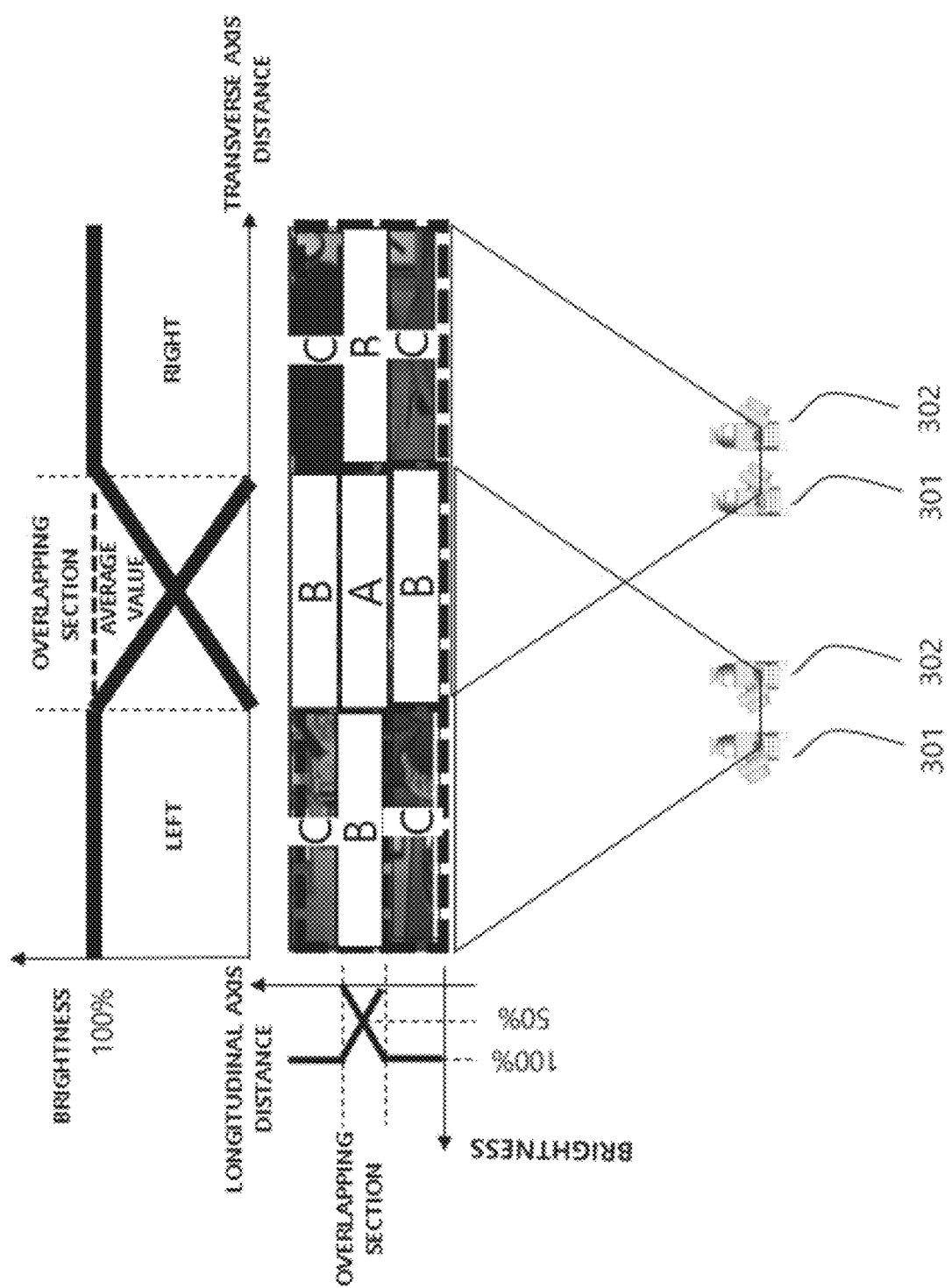
FIG. 5 is a diagram illustrating a method for controlling a lamp system according to an embodiment of the present invention in an area where light overlaps.

FIG. 5 is a diagram illustrating the method for controlling a lamp system 1000 according to an embodiment of the present invention in an area where light overlaps. In one embodiment, the image program may be provided so that the difference in brightness between overlapping areas A and B in which lights irradiated from the light output unit 300 overlaps and a non-overlapping area C in which lights irradiated from the light output unit 300 does not overlap is within a preset range. In one embodiment, the light output unit 300 includes a first light output unit 301 and a second light output unit 302 provided on the left and right sides of the vehicle, respectively. Referring to FIG. 5, the image program may be provided so that a brightness of light output from each light output unit 300 is halved in the area B where two lights of the light output unit 300 overlap, and the brightness of light output from each light output unit 300 is ¼ in the area A where four lights of the light output unit 300 overlap. This is in consideration of the fact that the brightness of light is doubled in the area B where two lights of the output unit overlap, and the brightness of light is quadrupled in the area A where four lights of the light output unit 300 overlap.

Figure 6:
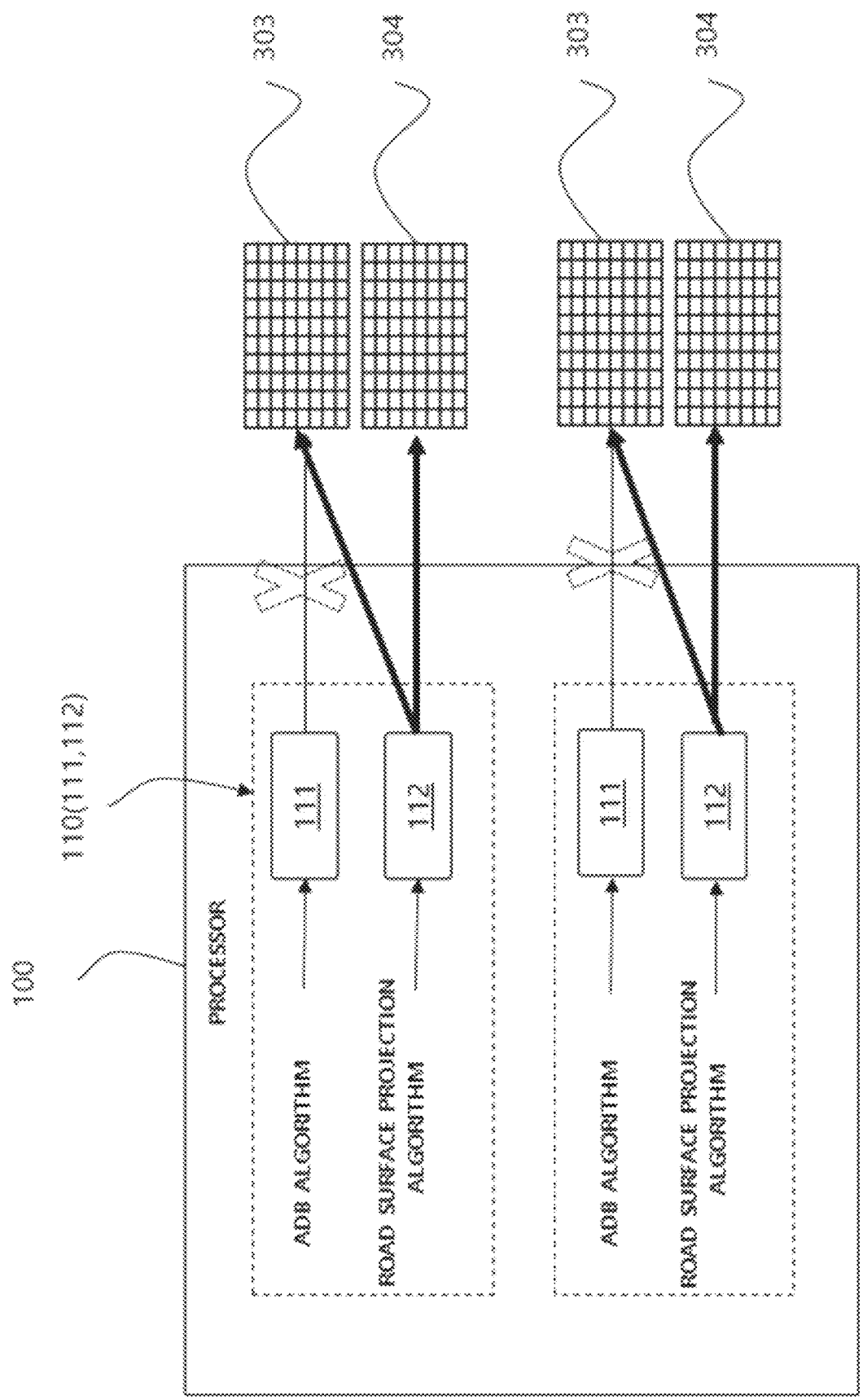
FIGS. 6 and 7 each are diagrams illustrating a method for controlling a lamp system according to an embodiment of the present invention when a wall surface is present in the front.
Figure 7:
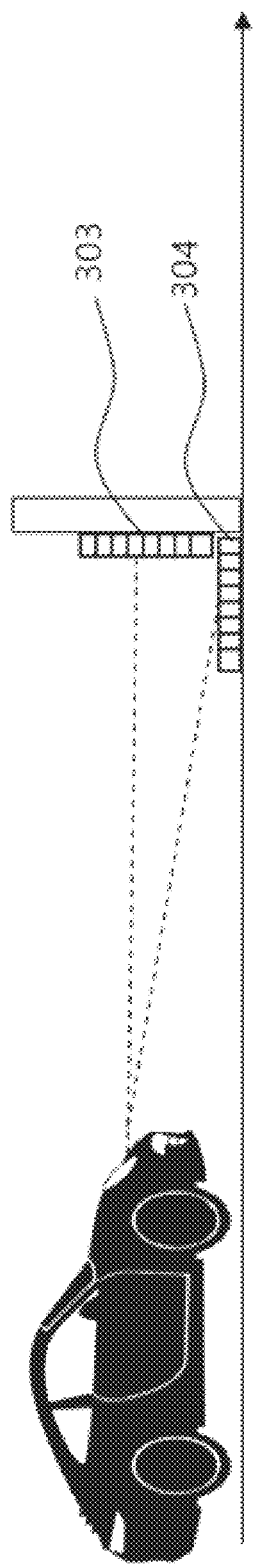

FIGS. 6 and 7 each illustrate the method for controlling a lamp system 1000 according to an embodiment of the present invention when a wall surface exists in the front. Referring to FIG. 6, in one embodiment, the processor 100 may allocate a first buffer 111 and a second buffer 112 to a road surface projection algorithm when the wall surface exists in front of the vehicle. This is because there is no need to use the adaptive driving beam algorithm of the vehicle when there is the wall surface in front of the vehicle, and the road surface projection algorithm may be applied to the wall surface as well. In one embodiment, when a distance between the wall surface and the vehicle exceeds a predetermined distance, the resolution of the second light output unit 302 may increase as the distance between the wall surface and the vehicle increases. This is because, as illustrated in FIG. 7, as the distance between the wall surface and the vehicle increases, the first light output unit 301 is lowered to a floor, and it is difficult to adjust the average resolution of the light output unit 300 by adjusting the resolution of the first light output unit 301. Accordingly, as the distance between the wall surface and the vehicle increases, the resolution of the second light output unit 302 increases so that the average resolution of the light output unit 300 increases.

Figure 8A:
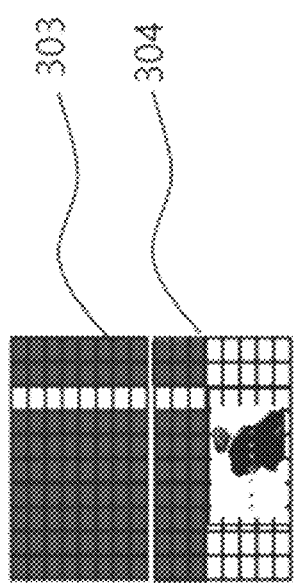
FIGS. 8A to 8C are diagrams illustrating a method for controlling a lamp system according to an embodiment of the present invention when an image is formed by overlapping a first optical channel and a second optical channel.
Figure 8B:
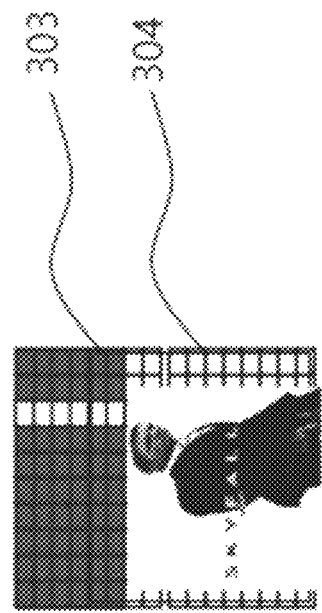
Figure 8C:
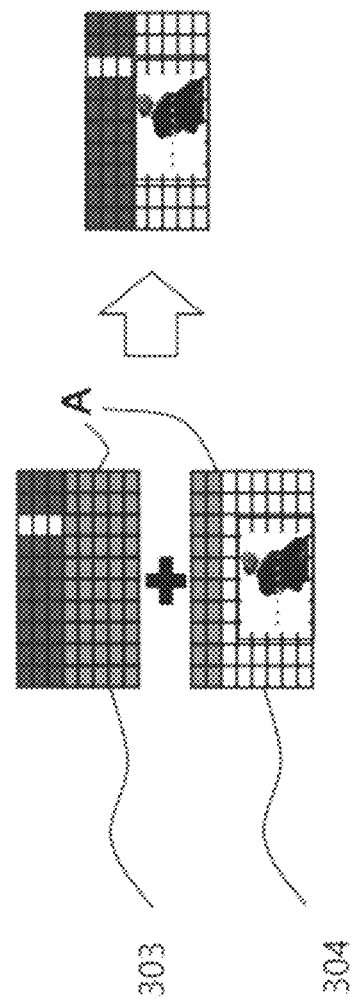

FIGS. 8A to 8C illustrate a method for controlling a lamp system 1000 according to an embodiment of the present invention when an image is formed by combining the first optical channel 303 and the second optical channel 304.

FIG. 8A illustrates a case in which a video according to an adaptive driving beam algorithm of a vehicle is expanded and a video according to a road surface projection algorithm is reduced to form a combined image. Accordingly, the video according to the adaptive driving beam algorithm of the vehicle is output to the first optical channel 303, and the video according to the adaptive driving beam algorithm of the vehicle and the road surface projection algorithm is output to the second optical channel 304 at a predetermined ratio. In this case, the first optical channel 303 may be provided above the second optical channel 304.

FIG. 8B illustrates a case in which the video according to the adaptive driving beam algorithm of the vehicle is reduced and the video according to the road surface projection algorithm is expanded to form the combined image. Accordingly, the video according to the adaptive driving beam algorithm of the vehicle and the road surface projection algorithm is output to the first optical channel 303, and the video according to the road surface projection algorithm is output to the second optical channel 304 at a predetermined ratio. In this case, the first optical channel 303 may be provided above the second optical channel 304.

FIG. 8C illustrates the case where the first optical channel 303 and the second optical channel 304 overlap to form an image. When the first optical channel 303 and the second optical channel 304 overlap to form an image, either the first optical channel 303 or the second optical channel 304 in the area A where the images overlaps is provided to be transparently processed. In one embodiment, the combined image is formed by combining one video layer formed by the first optical channel 303 and another video layer formed by the second optical channel 304. When it is expected that the overlapping area will occur when each video layer is combined, one of the two layers is transparently processed in the expected overlapping area A. Accordingly, when the two layers are combined, the video is not overlapped.

As described above, according to an embodiment of the present invention, it is possible to provide a lamp system and a method for controlling a lamp system capable of simultaneously performing an adaptive driving beam (ADB) algorithm and a road surface projection algorithm of a vehicle.

Effects of the present invention are not limited to the above-described effects, and effects that are not mentioned will be clearly understood by those skilled in the art to which the present disclosure pertains from the present specification and the accompanying drawings.

According to the present invention, the adaptive driving beam algorithm of the vehicle is allocated to the first buffer 111, and the road surface projection algorithm is allocated to the second buffer 112, so the adaptive driving beam algorithm of the vehicle and the road surface projection algorithm may be simultaneously implemented.

What is claimed is:

1. A lamp system, comprising:
   a light output unit located in a vehicle to irradiate light;
   a sensor unit detecting surrounding environment information of the vehicle;
   a memory storing an image program to be output by the light output unit; and
   a processor executing the image program based on the surrounding environment information,
   wherein the image program includes an adaptive driving beam (ADB) algorithm and a road surface projection algorithm of the vehicle,
   wherein the processor includes a first buffer allocated to the adaptive driving beam algorithm of the vehicle, and a second buffer allocated to the road surface projection algorithm.

2. The lamp system of claim 1, wherein the light output unit includes:
   a first light output unit connected to the first buffer; and
   a second light output unit connected to the second buffer and positioned for irradiating light above the first light output unit.

3. The lamp system of claim 2, wherein the image program is configured so that a difference in brightness is within a predetermined range between an overlapping area in which the light irradiated from the light output unit overlaps and a non-overlapping area in which the light irradiated from the light output unit does not overlap.

4. The lamp system of claim 1, wherein the light output unit comprises left side and right side units, each of the left side and right side units including a first light output unit and a second light output unit for irradiating light above the first light output unit, the left side and right side units being disposed on left and right sides of the vehicle, respectively, and
   the image program is configured so that a brightness of light is halved in an area where two lights of the light output unit overlap, and the brightness of light is ¼ in an area where four lights of the light output unit overlap.

5. The lamp system of claim 2, wherein the light output unit includes:
   a first optical channel formed by the adaptive driving beam algorithm of the vehicle; and
   a second optical channel formed by the road surface projection algorithm,
   the image program being configured so that either one of the first optical channel and the second optical channel is provided to be transparently processed in an area where images overlap when the first optical channel and the second optical channel overlap to form an image.

6. The lamp system of claim 2, wherein the processor allocates the first buffer and the second buffer to the road surface projection algorithm when a wall surface exists in front of the vehicle.

7. The lamp system of claim 6, wherein, when a distance between the wall surface and the vehicle exceeds a predetermined distance, the image program is configured so that a resolution of the second light output unit increases as the distance between the wall surface and the vehicle increases.

8. The lamp system of claim 1, wherein the processor includes:
   a plurality of graphic Integrated Circuits (ICs);
   a chip select pin to download the image program and transmit the downloaded image program to one of the graphic ICs through a chip select line; and
   a slide switch branching the chip select line to connect the chip select line to each input terminal of the graphic ICs and selectively turn on/off the chip select line.

9. A method for controlling a lamp system,
   wherein the lamp system comprises
   a processor performing an adaptive driving beam (ADB) algorithm and a road surface projection algorithm and having a first buffer and a second buffer, and
   a light output unit having a first light output unit connected to the first buffer and a second light output unit connected to the second buffer,
   the method comprising:
   allocating the adaptive driving beam algorithm of the vehicle to the first buffer;
   allocating the road surface projection algorithm to the second buffer; and
   simultaneously implementing the adaptive driving beam and road surface projection algorithms of the vehicle.

10. The method of claim 9, wherein a difference in brightness is maintained within a predetermined range between an overlapping area in which the light irradiated from the light output unit overlaps and a non-overlapping area in which the light irradiated from the light output unit does not overlap.

11. The method of claim 10, wherein the first light output unit and the second light output unit are provided on left and right sides of the vehicle, respectively, the method further comprising:
controlling a brightness of light output from each light output unit to be halved in an area where two lights of the light output unit overlap, and
controlling the brightness of light output from each light output unit to ¼ in an area where four lights of the light output unit overlap.

12. The method of claim 9, wherein the light output unit includes:
a first optical channel formed by the adaptive driving beam algorithm of the vehicle, and
a second optical channel formed by the road surface projection algorithm;
the method further comprising, when the first optical channel and the second optical channel overlap to form an image, controlling either one of the first optical channel and the second optical channel to be transparently processed in the area where the images overlap.

13. The method of claim 9, the method further comprising, using the processor, allocating the first buffer and the second buffer to the road surface projection algorithm when a wall surface exists in front of the vehicle.

14. The method of claim 13, wherein, when a distance between the wall surface and the vehicle exceeds a predetermined distance, increasing a resolution of the second light output unit as the distance between the wall surface and the vehicle increases.

15. The method of claim 9, wherein the processor includes a plurality of graphic Integrated Circuits (ICs); and
the method includes, using a chip select pin connected to the ICs, downloading an image program and transmitting the downloaded image program to the graphic ICs through a chip select line connected to the chip select pin; and
using a slide switch branching the chip select line, connecting the chip select line to each input terminal of the graphic ICs for individually turning on/off the chip select line.

* * * * *